(12) United States Patent
Blazvick

(10) Patent No.: US 7,963,772 B1
(45) Date of Patent: Jun. 21, 2011

(54) LEARNING APPARATUS

(76) Inventor: Shane F. Blazvick, Tampa, FL (US)

( * ) Notice: Subject to any disclaimer, the term of this patent is extended or adjusted under 35 U.S.C. 154(b) by 965 days.

(21) Appl. No.: 11/846,688

(22) Filed: Aug. 29, 2007

(51) Int. Cl.
*B43L 1/00* (2006.01)

(52) U.S. Cl. ........................................ 434/408

(58) Field of Classification Search .............. 434/408, 434/416, 421, 428, 429, 430; 40/611.1, 661
See application file for complete search history.

(56) References Cited

U.S. PATENT DOCUMENTS

| | | | |
|---|---|---|---|
| 5,655,323 A * | 8/1997 | Lassoff | 40/611.1 |
| 5,820,385 A | 10/1998 | Ohashi et al. | |
| 5,948,498 A * | 9/1999 | Bianco et al. | 428/81 |
| 5,987,825 A * | 11/1999 | Rosen | 52/36.1 |
| 6,007,891 A * | 12/1999 | Davis et al. | 428/81 |
| 6,416,329 B1 | 7/2002 | Hirota et al. | |
| 6,453,518 B1 * | 9/2002 | Adams et al. | 24/67.9 |
| 6,736,644 B1 * | 5/2004 | Vaughn | 434/408 |
| 6,850,230 B1 | 2/2005 | Vincent et al. | |
| 6,945,785 B2 * | 9/2005 | Sohl et al. | 434/408 |
| 6,955,130 B2 * | 10/2005 | Phillips | 108/96 |
| 7,093,857 B2 * | 8/2006 | Martin | 283/2 |
| 7,255,566 B2 * | 8/2007 | Galbraith Coates | 434/408 |
| 7,260,904 B1 * | 8/2007 | Boisseau | 40/107 |
| 7,347,020 B2 * | 3/2008 | Ray et al. | 40/781 |
| 2003/0031989 A1 | 2/2003 | Byrne | |
| 2003/0162162 A1 | 8/2003 | Marggraff | |

* cited by examiner

*Primary Examiner* — Kurt Fernstrom
(74) *Attorney, Agent, or Firm* — Crossley Patent Law; Mark A. Crossley

(57) ABSTRACT

The present invention concerns that of a new and improved learning apparatus that includes a base with an appealing shape, a covered amount of writing media for a toddler or child to write on repeatedly, and a storage area on the base for placement of at least one learning book. The base preferably has a shape that is interesting and fun for children, such as an apple. Attached to the base is a frame that encloses a writing medium underneath a transparent, flexible cover. The cover gives toddlers and children the ability to write on the transparent cover, while at the same time, allowing an individual, such as a parent or guardian, to remove the writing placed on the cover by merely wiping it off. The learning apparatus also includes a storage area that could be used to house at least one educational book.

7 Claims, 2 Drawing Sheets

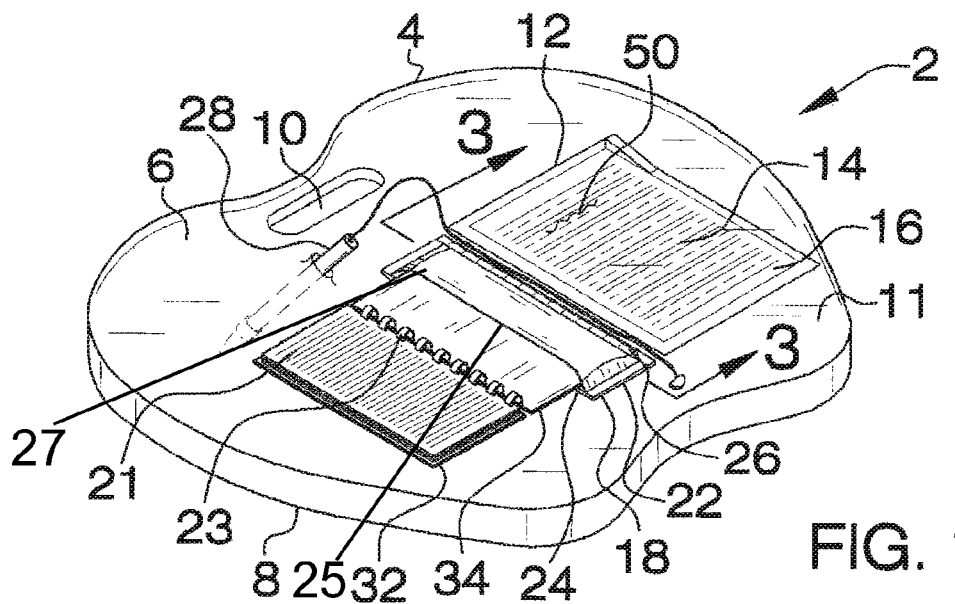
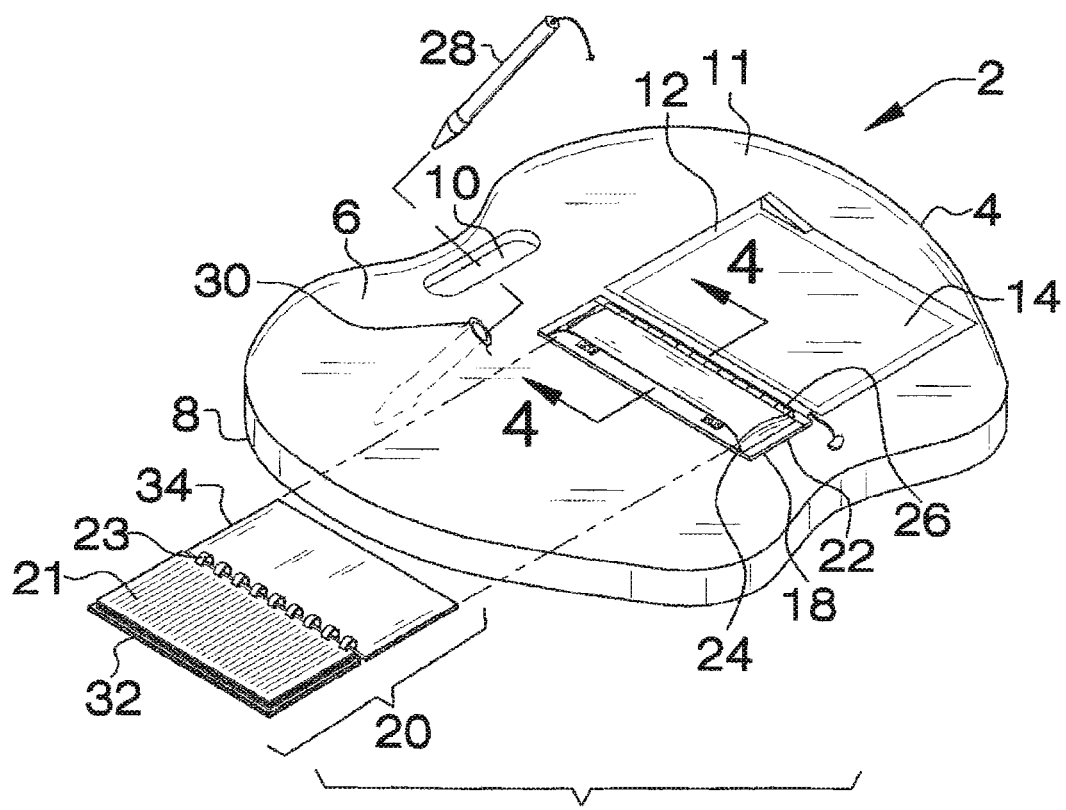
FIG. 1
FIG. 2

LEARNING APPARATUS

BACKGROUND OF THE INVENTION

The present invention concerns that of a new and improved learning apparatus that includes a base with an appealing shape to a young child, a covered amount of writing media for a toddler or child to write on repeatedly, and a storage area on the base for placement of at least one learning book.

DESCRIPTION OF THE PRIOR ART

U.S. Pat. No. 6,416,329 B1, issued to Hirota et al., discloses a magnetically writable and erasable writing device for practice in writing characters.

U.S. Pat. No. 6,850,230 B1, issued to Vincent et al., discloses an electronic writing instrument for rewritable electronic writing surfaces.

United States Application No. 2003/0031989 A1, filed by Byrne, discloses an instructional method for teaching the sounds of the alphabet, the formation of the strokes of the letters of the alphabet, and the placement of the letters of the alphabet on primary lined paper.

U.S. Pat. No. 5,820,385, issued to Ohashi et al., discloses a magnetic writing toy that is erasable.

United States Application No. 2003/0162162 A1, filed by Marggraff, discloses an interactive print media apparatus.

SUMMARY OF THE INVENTION

The present invention concerns that of a new and improved learning apparatus that includes a base with an appealing shape, a covered amount of writing media for a toddler or child to write on repeatedly, and a storage area on the base for placement of at least one learning book. The base preferably has a shape that is interesting and fun for children, such as an apple. Attached to the base is a frame that encloses a writing medium underneath a transparent, flexible cover. The cover gives toddlers and children the ability to write on the transparent cover, while at the same time, allowing an individual, such as a parent or guardian, to remove the writing placed on the cover by merely wiping it off. The learning apparatus also includes a storage area that could be used to house at least one educational book.

There has thus been outlined, rather broadly, the more important features of a learning apparatus that the detailed description thereof that follows may be better understood and in order that the present contribution to the art may be better appreciated. There are, of course, additional features of the learning apparatus that will be described hereinafter and which will form the subject matter of the claims appended hereto.

In this respect, before explaining at least one embodiment of the learning apparatus in detail, it is to be understood that the learning apparatus is not limited in its application to the details of construction and to the arrangements of the components set forth in the following description or illustrated in the drawings. The learning apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present learning apparatus. It is important, therefore, that the claims be regarded as including such equivalent constructions insofar as they do not depart from the spirit and scope of the present invention.

It is therefore an object of the present invention to provide a learning apparatus which has all of the advantages of the prior art and none of the disadvantages.

It is another object of the present invention to provide a learning apparatus which may be easily and efficiently manufactured and marketed. It is another object of the present invention to provide a learning apparatus which is of durable and reliable construction.

It is yet another object of the present invention to provide a learning apparatus which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

FIG. 1 shows a perspective view of the learning apparatus as it would appear in use.

FIG. 2 shows a perspective view of the learning apparatus as it would appear in use with a learning book being pulled out of the learning apparatus.

DESCRIPTION OF THE PREFERRED EMBODIMENT

Figure 3:
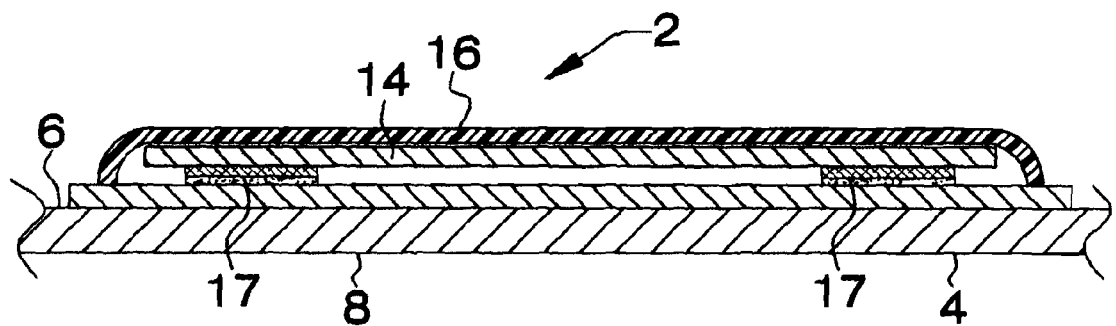
FIG. 3 shows a side view of the frame of the learning apparatus as it would appear in use.
Figure 4:
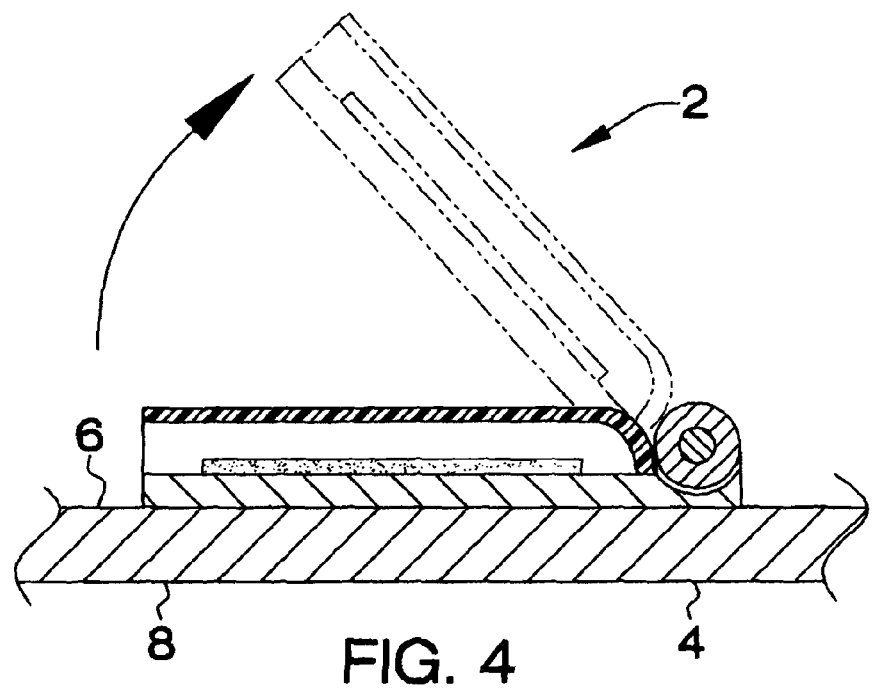
FIG. 4 shows an end view of the storage area of the learning apparatus.

With reference now to the drawings, and in particular to FIGS. 1 through 4 thereof, a new learning apparatus embodying the principles and concepts of the present invention and generally designated by the reference numeral 2 will be described.

As best illustrated in FIGS. 1 through 4, the learning apparatus 2 comprises a base 4 that has two surfaces comprising a top surface 6 and a bottom surface 8. The base 4 itself is preferably in a particular shape that is appealing to toddlers and/or children, such as an apple. The base 4 could clearly have a wide variety of other shapes and still fall under the purview of this disclosure.

The base 4 has a mounting hole 10 to allow the learning apparatus 2 to be hung on a vertical surface when it is not in use. Furthermore, the base 4 would preferably be fabricated from plastic 11.

A frame 12 is attached to the top surface 6 of the base 4. The frame 12 is designed to enclose a writing medium 14 by holding a cover 16 over the writing medium 14. The writing medium 14 is likely just an object such as a piece of paper that an infant or toddler would normally write on with a writing apparatus. The cover 16, obviously, is transparent to allow a toddler and/or child to see the writing medium 14. Within the cover 16, writing medium 14 can alternatively be mounted on a plurality of mounts 17 to prevent the writing medium 14 from moving around underneath the cover 16 and help it remain firmly in place. The mounts 17 are located in between the top surface of the base 4 and the writing medium 14.

The writing apparatus preferably used by an individual would be a marker 28, which would be attached to the base 4 via a string 40 and an attachment point 42. The string 40 has two ends, a first end and a second end, with the first end of the string 40 being attached to the marker 28 and the second end of the string 40 being attached to the attachment point 42. Furthermore, the marker 28 would be stored within a marker slot 30 when it would not be in use, with the market slot 30 being a hole in the top surface 6 of the base 4. When used by an individual, the marker 28 is capable of placing erasable writing 50 onto the cover 16, which can later be wiped off with a cloth or paper toweling as needed.

When a toddler or a child would want to use the marker 28, he or she could merely write on the cover 16 that is over the writing medium 14. When done, an adult or other caregiver could then merely wipe off the writing deposits on the cover 16 fairly easily, thereby saving the writing medium 14 and allowing individuals to continue to repeatedly use cover 16 on additional occasions.

Learning apparatus 2 also has a storage area 18 attached to the top surface 6 of the base 4, with the storage area 18 comprising a backing tab 22 with a top-mounted slot 24, with the backing tab 22 being attached to the top surface 6 of the base 4. The slot 24 is pivotally attached to the backing tab 22 via hinge 26 and can move upward away somewhat from the base 4, allowing an individual to place at least a portion of a learning book 20 within the storage area 18 before allowing the slot 24 to be put back down. The slot 24 has an elongated substantially U-shaped horizontal opening 25 disposed on a front side of the slot 27. The learning book 20 is shown with a front cover 32 and a rear cover 34 attached to a hinge 23, along with a plurality of pages 21 also attached to the hinge 23. Alternatively, other objects or learning tools can be placed within the storage area 18.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A learning apparatus comprising:
   a base having two surfaces comprising a top surface and a bottom surface,
   means for mounting the learning apparatus on a vertical surface,
   a frame attached to the top surface of the base,
   a writing medium associated with the frame,
   means for allowing individuals to place erasable writing on the learning apparatus,
   wherein the means for mounting the learning apparatus on a vertical surface comprises a mounting hole, the mounting hole located on the base of the learning apparatus,
   wherein the learning apparatus further comprises
   an educational book, and
   means for storing the educational book on the top surface of the base,
   wherein the means for storing the educational book on the top surface of the base further comprises a storage area, the storage area being attached to the top surface of the base,
   wherein the storage area further comprises
   a backing tab attached to the top surface of the base,
   a slot pivotally attached to the backing tab, the slot having an elongated substantially U-shaped horizontal opening disposed on a front side of the slot,
   wherein at least a portion of the educational book can be placed within the storage area through the slot.

2. A learning apparatus according to claim 1 wherein the means for allowing individuals to place erasable writing on the learning apparatus
   (a) a cover attached to the frame, the cover being located over the writing medium,
   (b) mounting means for mounting the writing medium within the area underneath the cover so that it remains firmly in place,
   (c) a writing apparatus,
   (d) means for attaching the writing apparatus to the top surface of the base,
   (e) wherein an individual can use the writing apparatus to place erasing writing on the cover located over the writing medium.

3. A learning apparatus according to claim 2 wherein the writing apparatus further comprises a marker.

4. A learning apparatus according to claim 3 wherein the means for attaching the writing apparatus to the top surface of the base further comprises
   (a) a piece of string having two ends comprising a first end and a second end,
   (b) an attachment point located on the top surface of the base,
   (c) wherein the first end of the string is attached to the marker, and
   (d) wherein the second end of the string is attached to the attachment point located on the top surface of the base.

5. A learning apparatus according to claim 4 wherein the mounting means for mounting the writing medium within the area underneath the cover so that it remains firmly in place further comprises at least a pair of mounts, the pair of mounts being located in between the top surface of the base and the writing medium.

6. A learning apparatus according to claim 5 wherein the cover attached to the frame is transparent.

7. A learning apparatus according to claim 6 wherein the base is fabricated from plastic.

* * * * *